(12) United States Patent
kwan

(10) Patent No.: US 9,946,258 B2
(45) Date of Patent: Apr. 17, 2018

(54) HIGH PERFORMANCE SYSTEM WITH EXPLICIT INCORPORATION OF ATC REGULATIONS TO GENERATE CONTINGENCY PLANS FOR UAVS WITH LOST COMMUNICATION

(71) Applicant: Chiman kwan, Rockville, MD (US)

(72) Inventor: Chiman kwan, Rockville, MD (US)

( * ) Notice: Subject to any disclaimer, the term of this patent is extended or adjusted under 35 U.S.C. 154(b) by 0 days.

(21) Appl. No.: 15/193,034

(22) Filed: Jun. 25, 2016

(65) Prior Publication Data

US 2018/0017967 A1 Jan. 18, 2018

Related U.S. Application Data

(60) Provisional application No. 62/192,613, filed on Jul. 15, 2015.

(51) Int. Cl.
*G05D 1/00* (2006.01)
*G08G 5/00* (2006.01)

(52) U.S. Cl.
CPC ......... *G05D 1/0055* (2013.01); *G05D 1/0022* (2013.01); *G08G 5/0013* (2013.01); *G08G 5/0021* (2013.01); *G08G 5/0034* (2013.01); *G08G 5/0056* (2013.01); *G08G 5/0069* (2013.01)

(58) Field of Classification Search
CPC .......................... G05D 1/0055; G08G 5/0013
See application file for complete search history.

(56) References Cited

U.S. PATENT DOCUMENTS

| 9,405,005 | B1* | 8/2016 | Arteaga | G01S 13/91 |
| 9,613,536 | B1* | 4/2017 | Wolford | G08G 5/003 |
| 2010/0315281 | A1* | 12/2010 | Askelson | G01S 7/003 342/30 |
| 2015/0365159 | A1* | 12/2015 | Bosworth | G08G 5/0069 455/11.1 |
| 2016/0275801 | A1* | 9/2016 | Kopardekar | G08G 5/0043 |

* cited by examiner

*Primary Examiner* — Adam D Tissot
*Assistant Examiner* — Alex C Dunn
(74) *Attorney, Agent, or Firm* — WPAT, PC

(57) ABSTRACT

The present invention is to provide a method and system for generating contingency flight plans for normal landing and flight termination (crash) of UAVs (drones) in the event of lost communications with ground control stations. The system is fast, automatic, comprehensive, and systematic. The contingency plan can be generated using laptops or PCs. The execution of contingency plans will involve the coordination of flight computer in drones, ground control station, air traffic controllers (ATC), and pilot in command (PIC). External devices such as satellites and RF towers are also involved in the process such as reestablishment of communications.

19 Claims, 6 Drawing Sheets

HIGH PERFORMANCE SYSTEM WITH EXPLICIT INCORPORATION OF ATC REGULATIONS TO GENERATE CONTINGENCY PLANS FOR UAVS WITH LOST COMMUNICATION

This application claims priority to U.S. Provisional Patent Application No. 62/192,613 filed on Jul. 15, 2015, the entire content of which is incorporated herein by reference.

BACKGROUND OF THE INVENTION

The current practice to mitigate lost link or communications with ground control stations is to manually generate contingency plans. This process is tedious, error prone, time consuming, and not suitable for long duration flights with hundreds of waypoints. During lost link or communications with ground control stations, a contingency flight plan is critical for normal landing and flight termination (crash) of an Unmanned Aerial Vehicle (UAV), commonly known as a Drone. The present invention includes methods and systems that can generate contingency plans for lost links in a fast, automatic, comprehensive, and systematic manner.

Most past studies focused on the impact of lost links mainly from the air traffic controller's view point, but missed many areas in the roles of pilots and mishap UAVs. These areas include: mitigation, prevention and rescue/recovery strategies and plans from maintenance engineers, mission planners, and pilots.

SUMMARY OF THE INVENTION

One embodiment of the present invention is to provide a method and system for generating contingency flight plans for a normal landing and flight termination (crash) of the UAV/drone in the event of lost communications with ground control stations. The system is fast, automatic, comprehensive, and systematic. The contingency plan can be generated using laptops or PCs. The execution of the contingency plan will involve the coordination of flight computer in the drone, the ground control station, Air Traffic Controllers (ATC), and the Pilot-In-Control (PIC). External devices, such as, satellites and RF towers are also involved in the contingency plan generating process. One key feature of such process is the reestablishment of communications.

Another embodiment of the present invention is to provide a Risk Management Plan (RMP), which analyzes the risk against the causes of lost link throughout the primary flight path. The RMP also assesses the risk of the Lost Link Plan (LLP) of multiple UAVs in the same area, and adjusts the primary flight path to reach the destination, if necessary.

Another embodiment of the present invention is to provide a Preparedness & Prevention Plan (PPP), which standardizes LLP generation by maximizing predictability of mishap UAVs. The PPP also standardizes a dynamic LLP based on the situation, and obtains confirmation from the ATC supervisor through a standard interface. Further, the PPP maintains a highly reliable on-board communication device, a surveillance system, and a ground control system. The PPP links maintenance data to a common ground control system, and uses a Case Based Reasoner (CBR) to help the PIC to prepare for a LL before it happens.

Another embodiment of the present invention is to provide an Incident Response Plan (IRP), which standardizes the pilot and the ATC communication, tracks flight statuses, and the possible trajectory for the mishap UAV by incorporating the speed and time uncertainty. The Incident Response Plan (IRP) also accelerates the ATC to redirect other nearby vehicles by sending the LL plan to the ATC via a data link using a Graphical User Interface (GUI) to display the LLP.

Another embodiment of the present invention is to provide a Rescue and Recovery Plan (RRP), which renews the link when the UAV arrives at a rendezvous point. It specifies the flight termination points in the LLP, for example, landing on a given runway if it has the capability, or to crash at an unpopulated area without creating collateral damages.

Another embodiment of the present invention is to explicitly incorporate the Federal Aviation Administration (FAA)/ATC regulations, which are imposed by FAA to ensure flight safety to other manned or unmanned aircraft in the nearly airspace of the lost link UAV.

Another embodiment of the present invention is to incorporate human expert knowledge to help the PIC diagnose potential cause of a lost link before lost link actually occurs. This will help the PIC to prepare for the actual lost link event.

Another embodiment of the present invention is to provide a standardized lost link data structure, which is applicable to large and small UAVs.

Another embodiment of the present invention is to utilize pre-defined databases, such as, airports, landing places, lakes, and RF towers, etc. to automatically generate contingency plans in a few minutes.

The foregoing and other objects, features, and advantages of the invention will become more apparent from the following detailed description, which proceeds with reference to the accompanying figures.

DETAILED DESCRIPTION OF THE INVENTION

Figure 1:
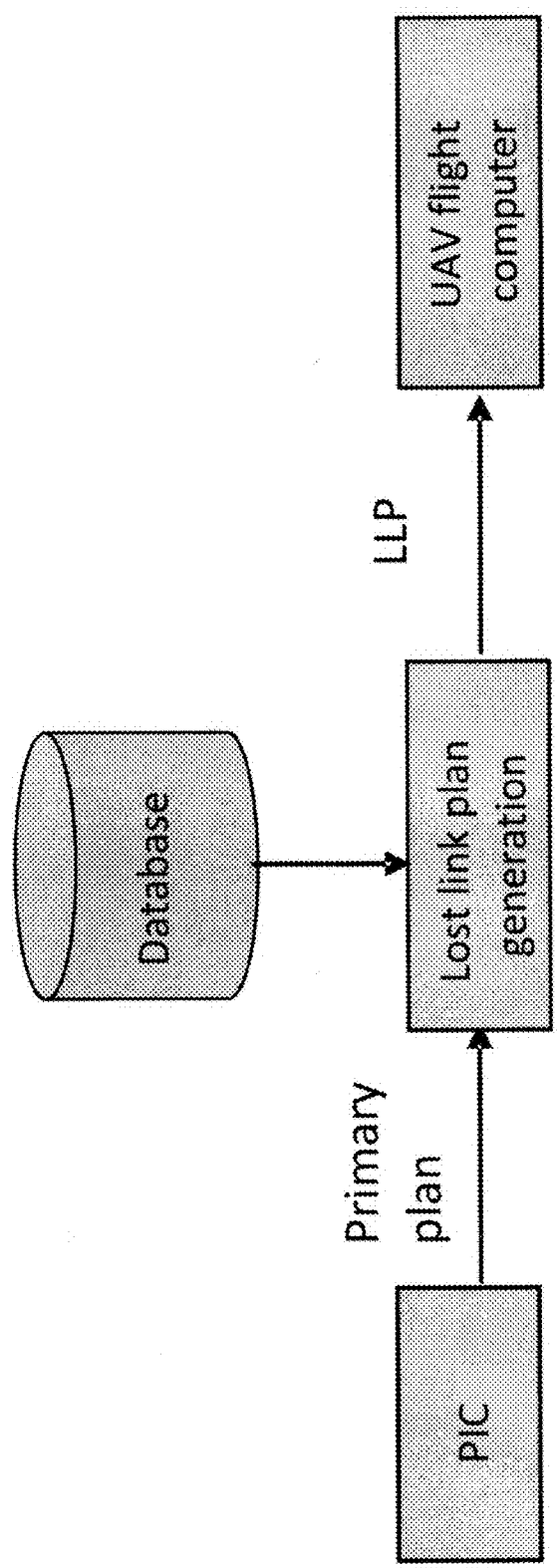
FIG. 1 is a simplified Lost Link Plan (LLP) generation architecture.
Figure 2:
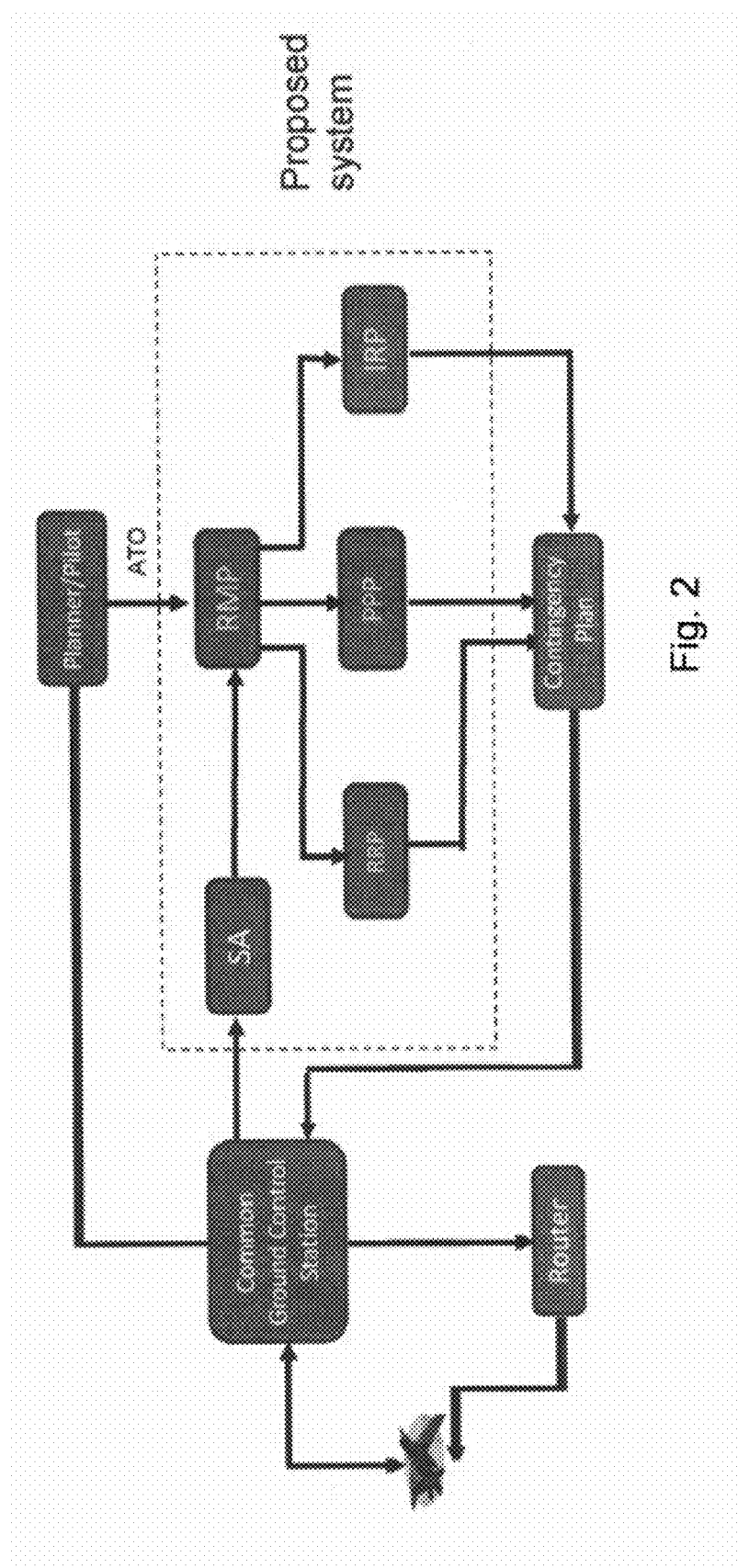
FIG. 2 shows the relationship between the four parts of the LLP generation architecture.

FIG. 1 illustrates a lost link plan (LLP) generation architecture. The present invention for LLP generation takes the primary plan from the pilot-in-control (PIC) and utilizes information from a wide variety of data sources. The wide variety of data sources can be obtained from any or the combination of, for example, FAA/ATC regulations, airport locations, safe landing places, RF tower locations, airspace structure information, and no fly zones information, etc., to generate a comprehensive LLP. The LLP is generated off-line by a number of modules as shown in FIG. 2, before the UAV takes off. As compared to conventional manual plan generation process that may take hours to finish for long flights, the LLP of the present invention is fully automatic, fast, and can be generated in less than 5 minutes. The LLP generated in accordance to the present invention is error free and comprehensive, providing safe contingency plans to minimize collateral damages to ground structures and humans. During an actual flight, the UAV flight computer periodically monitors the heartbeat signal between the UAV and the ground control station (GCS). If the heartbeat signal is lost more than a preset number of minutes, the LLP will be activated and the UAV will follow the contingency flight plans in the LLP to fly to certain locations (airports or crashing sites) safely.

Lost Link Plan (LLP) Generation Framework

As shown in FIG. 2, the present invention is to mitigate lost links in UAVs. The procedures have four parts:
1) risk analysis;
2) preparedness and prevention plan;
3) incident response plan; and
4) rescue and recovery plan.

Some key points of each part of the proposed procedures are highlighted as follows:

I. Risk Management Plan (RMP):
 a. With the help of a situation analysis (SA) module, analyze the risk against the causes of lost link throughout the primary flight path;
 b. Assess the risk of LLP of multiple UAVs in the same area; and
 c. Adjust the primary flight path if necessary to reach the destination.

II. Preparedness & Prevention Plan (PPP):
 a. Standardize the LLP generation by maximizing predictability of mishap UAVs;
 b. Standardize the dynamic LLP based on the situation, and obtain confirmation from the ATC supervisor through a standard interface;
 c. Maintain highly reliable on-board communication devices, such as, surveillance systems, and ground control systems. Maintenance data is linked to common ground control system; and
 d. Use Case Based Reasoning (CBR) to help PIC to prepare for a potential LL before it happens.

III. Incident Response Plan (IRP):
 a. Standardize Pilot and ATC communication;
 b. Track flight status and possible trajectory for the mishap UAV, incorporating speed and time uncertainty; and
 c. Accelerate ATM to redirect other nearby vehicles by sending the LL plan to ATC via a data link and the use of GUI to display the LL plan.

IV. Rescue and Recovery Plan (RRP):
 a. Renew the communication link when the UAS arrives at a rendezvous point;
 b. Specify flight termination points in the LLP. Landing on a given runway if it has the capability; and
 c. Crash at an unpopulated area without creating collateral damages.

Systematic Lost Link Generation Procedures

Figure 3:
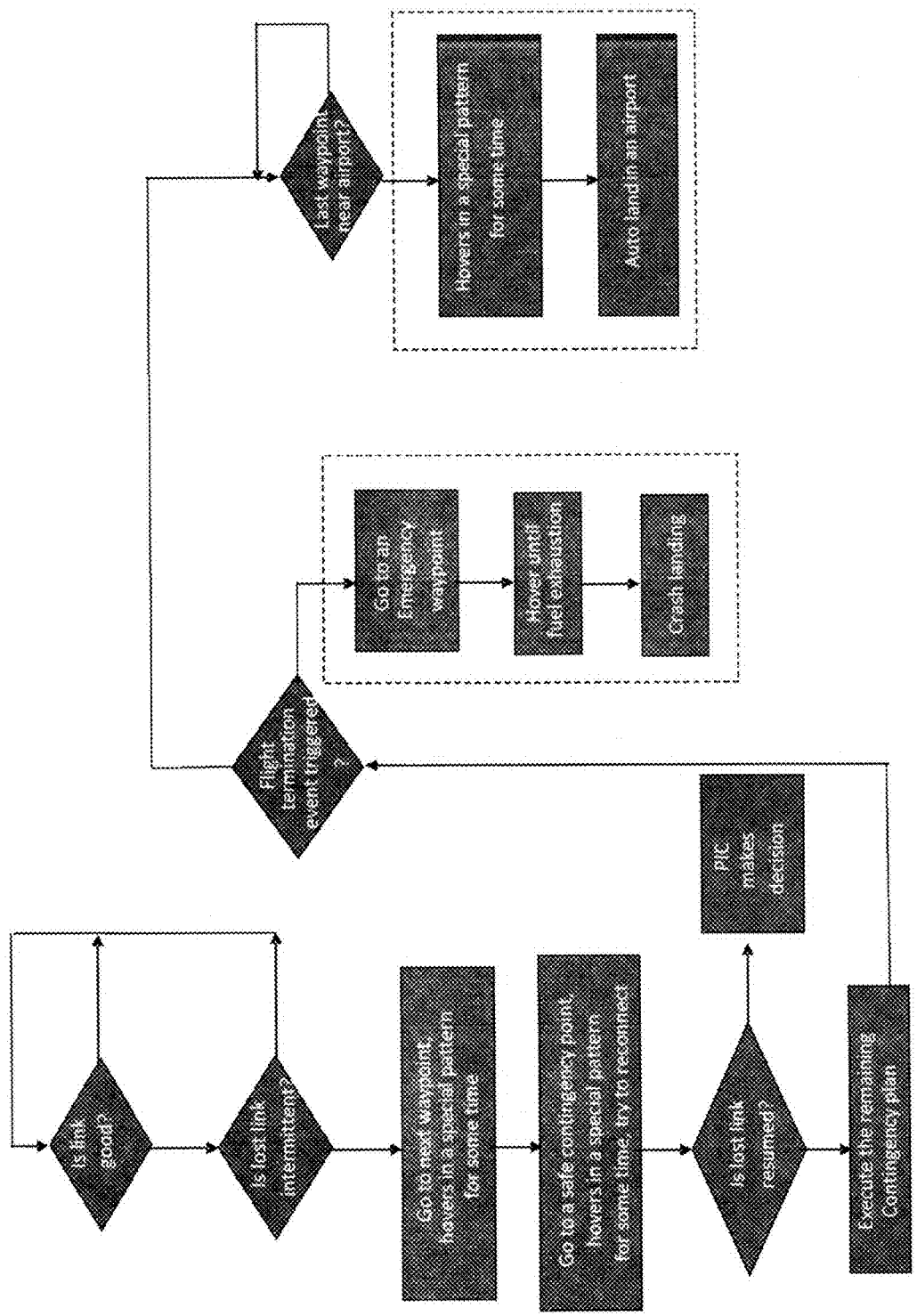
FIG. 3 shows a flow chart of a typical Lost Link Plan.

FIG. 3 shows a typical flow chart of a LLP. Some of the FAA regulations are explicitly shown. For example, after lost link is confirmed, the mishap UAV continues to fly to the next waypoint and hovers using a special pattern. This satisfies the following Rules of the FAA regulations:
 1. Continue its current path for some time; and
 2. Communicating with ATC and PIC that it has a lost link problem.

Other FAA regulations are implicitly satisfied. For example, the flight termination points are pre-selected before the mission starts, and they are located in unpopulated areas.

Figure 4:
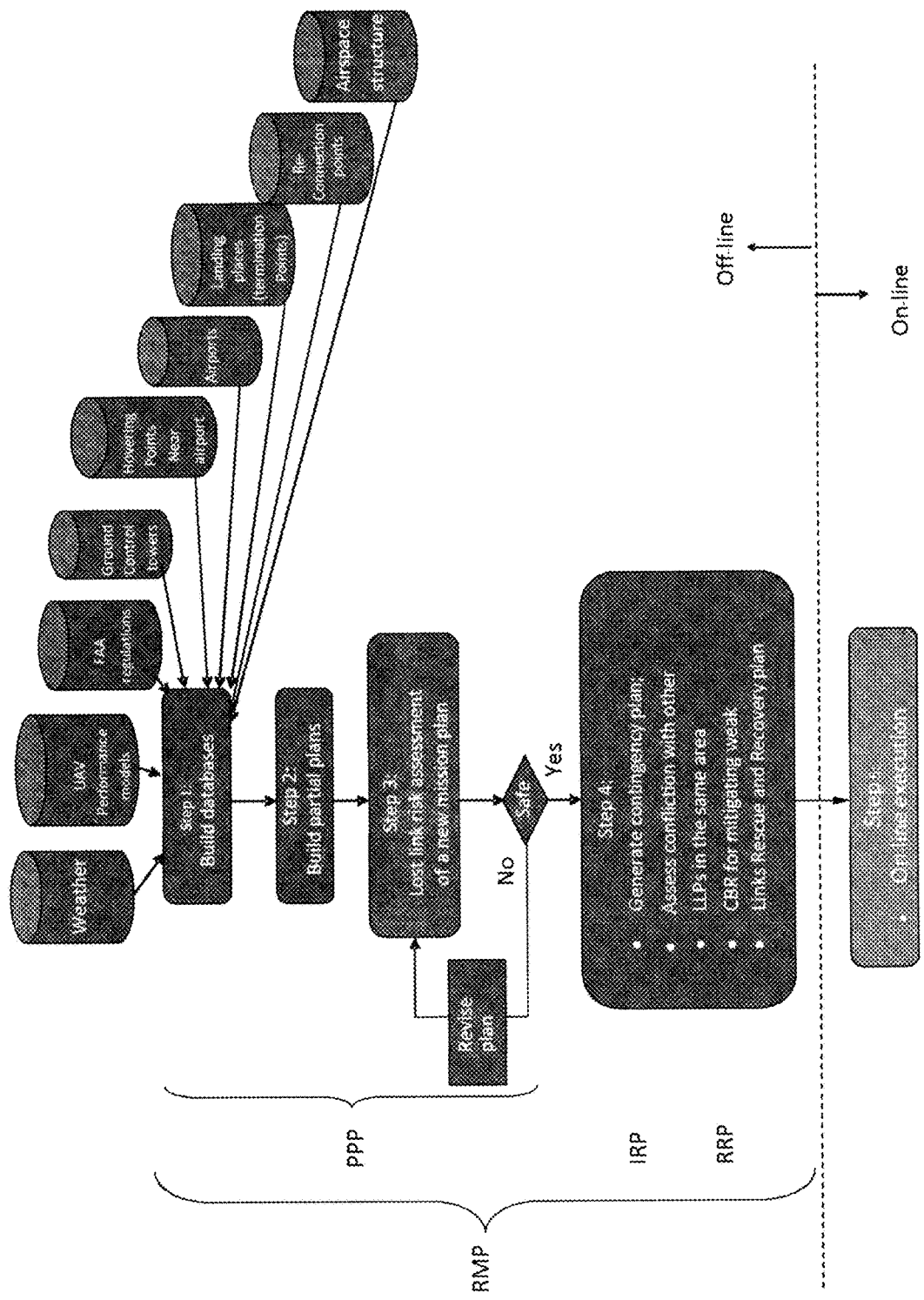
FIG. 4 shows the proposed Lost Link Plan of the present invention.

Referring to FIG. 4, it illustrates the key steps in generating a complete LLP that satisfies all the FAA regulations mentioned above. In order to quickly and automatically generate a comprehensive LLP in a few minutes, some key steps are necessary:

1. Step 1 is the creation of databases. There are many databases needed to be created, for example, FAA regulations, UAV performance models, airspace structure, ground radio towers, airport locations, flight termination points, rally/reconnection waypoints, and hovering waypoints near airports. These databases will be critical for later steps in the LLP generation process;
2. Step 2 is the generation of partial plans. One type of partial plan consists of a set of waypoints from rally/reconnection waypoints to airports. Another type of partial plans includes stitches to connect from any waypoints in the primary and contingency plan to the flight termination points. All of these partial plans can be generated off-line. This will significantly reduce the contingency plan generation time. Given a new mission plan;
3. Step 3 is to perform lost link risk assessment. For example, weather information in the mission area, communication equipment maintenance history, etc. will be used to assess the risk of lost link in the mission area. If lost link risk is deemed high, primary mission plan will be revised or aborted;
4. Step 4 is the LLP generation step. Information from partial plans, landing places, airports, etc. will be integrated together to form the complete plan. In addition, if there are other UAVs flying in the same area, the potential risk of conflicting LLPs will be assessed according to one of the FAA regulations. Rescue and Recovery Plan (RRP) is also generated in this step; and
5. Step 5 is the on-line execution of the LLP after lost links happens. Details of how to build the various databases, partial plans, complete LLP, and delta plans for en route and non-en route flights are accomplished easily by the aforementioned key steps.

In addition, an expert system based on the CBR is used to help PIC mitigate lost link (LL) before the LL actually happens. This will be a preventive measure to help the pilot-in-control deals with an intermittent LL.

Some examples of the various flight scenarios for UAVs are listed in Table 1 below. Creating UAV plans for all these 9 scenarios listed is possible. However, for simplicity purpose, only example for scenario 1 below is included. For scenario 1, two demonstrations are produced, one for the lost link and the other one for the termination.

TABLE 1

Provisional unmanned aircraft scenarios

|  | 1<br>High altitude surveillance/ Aerial work (search pattern) (ATC radar/ADS-B control for separation) | 2<br>Medium altitude surveillance/ Aerial work (search pattern) (ATC radar control for separation) | 3<br>En Route Oceanic Class A procedural ATC control | 4<br>Low level surveillance Maritime patrol International (non Radar, Non ATC control) Class G | 5<br>Short En Route populated land Class A, B, C (ATC radar control for separation) |
|---|---|---|---|---|---|
| Max altitude (feet above MSI, unless otherwise specified) | 66 000 | 30 000 | 60 000 | 10 000 | 38 000 |
| Min altitude (feet above MSI, unless otherwise specified) | 30 000 | 19 000 | 20 000 | 500 | 19 000 |
| Max latitude (deg) | 90 | 90 | 90 | 90 | 70 |
| Max rain rate at aircraft (mm/hr)/[1] | 0 | 5 | 20 | 10 | 20 |
| Max ground speed including wind (knots = NM/h) | 50 | 300 | 550 | 250 | 550 |
| Min ground Speed | 0 | 100 | 250 | 80 | 150 |
| Max Roll (deg) | 10 | 20 | 10 | 30 | 10 |
| Max Pitch (deg) | 5 | 5 | 5 | 10 | 5 |
| Max ATC Voice/Data Round Trip Latency (seconds) | 10 | 5 | 120 | Not relevant | 5 |
| Max aircraft response time over C2/C3 link e.g. for DAA (seconds) | 5 | 2 | 30 | 2 | 2 |

|  | 6<br>Medium range -Low altitude surveillance over land Below 1000 ft Above Ground Level (AGL) Linear feature and/or search pattern Class G (no ATC separation) | 7<br>Departure Descent above 3000 ft Above Ground Level (AGL) (ATC radar control for separation) | 8<br>Take-off/ land, taxi | 9<br>Urban Surveillance - Very low level, short range, very small fixed or rotary wing Class G (no ATC separation) |
|---|---|---|---|---|
| Max altitude (feet above MSI, unless otherwise specified) | 1000 AGL | 19 000 | 3000 AGL | 400 Above Ground Level |
| Min altitude (feet above MSI, unless otherwise specified) | 100 AGL | 3 000 AGL | 0 AGL | 0.5 Above Ground Level |
| Max latitude (deg) | 90 | 70 | 70 | 70 |
| Max rain rate at aircraft (mm/hr)/[1] | 5 | 20 | 20 | 3 |
| Max ground speed including wind (knots = NM/h) | 150 | 250 | 200 | 50 |
| Min ground Speed | 40 | 100 | 0 | 0 |
| Max Roll (deg) | 30 | 20 | 30 | 20 |
| Max Pitch (deg) | 5 | 10 | 10 | 5 |
| Max ATC Voice/Data Round Trip Latency (seconds) | Not relevant | 3 | 1 | Not relevant |
| Max aircraft response time over C2/C3 link e.g. for DAA (seconds) | 1 | 1 | 1 | 0.5 |

Scenario 1: High Altitude Surveillance/Aerial Work (Search Pattern)

Figure 5:
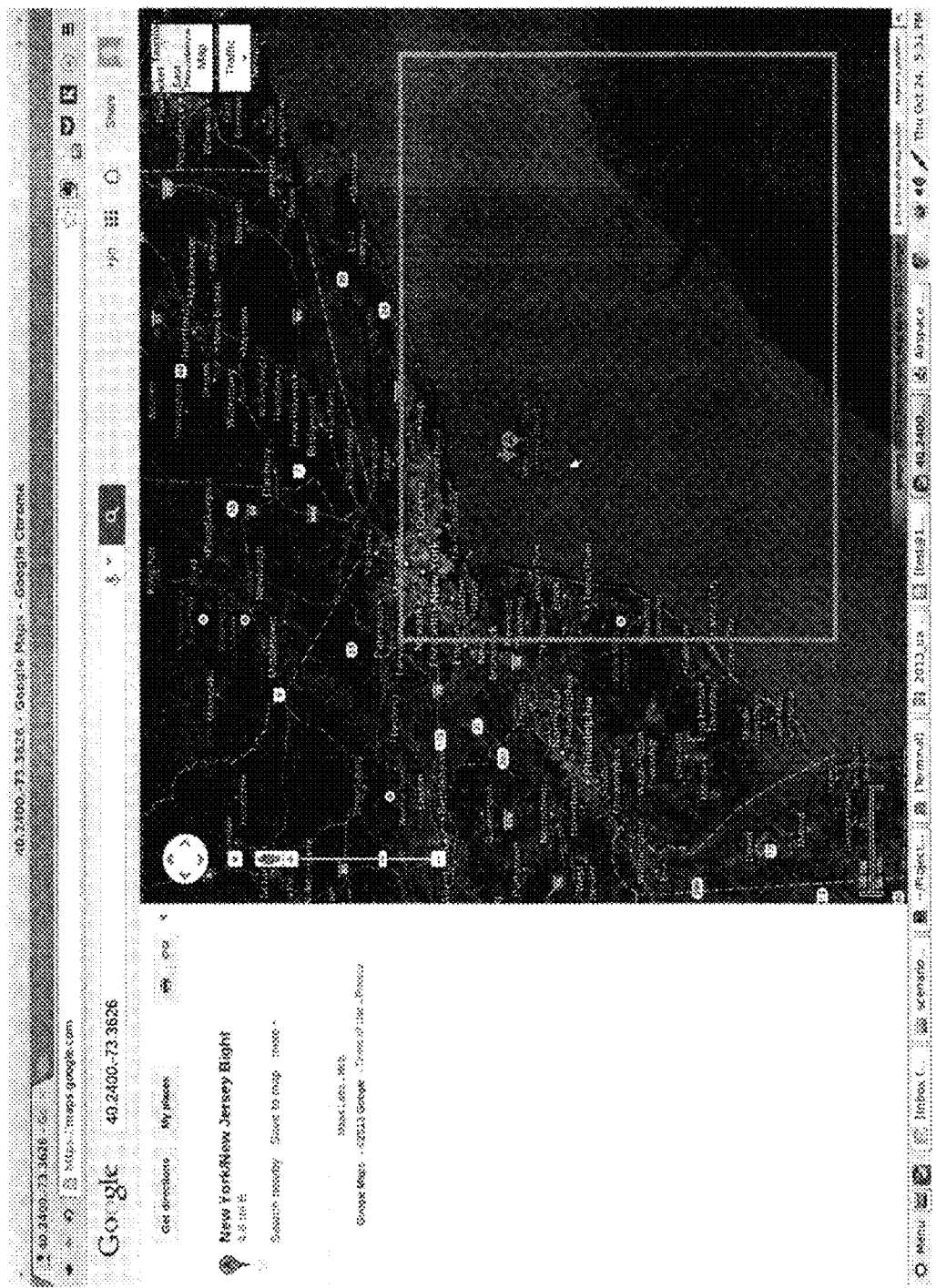
FIG. 5 shows the use of Google Map for Scenario 1.
Figure 6:
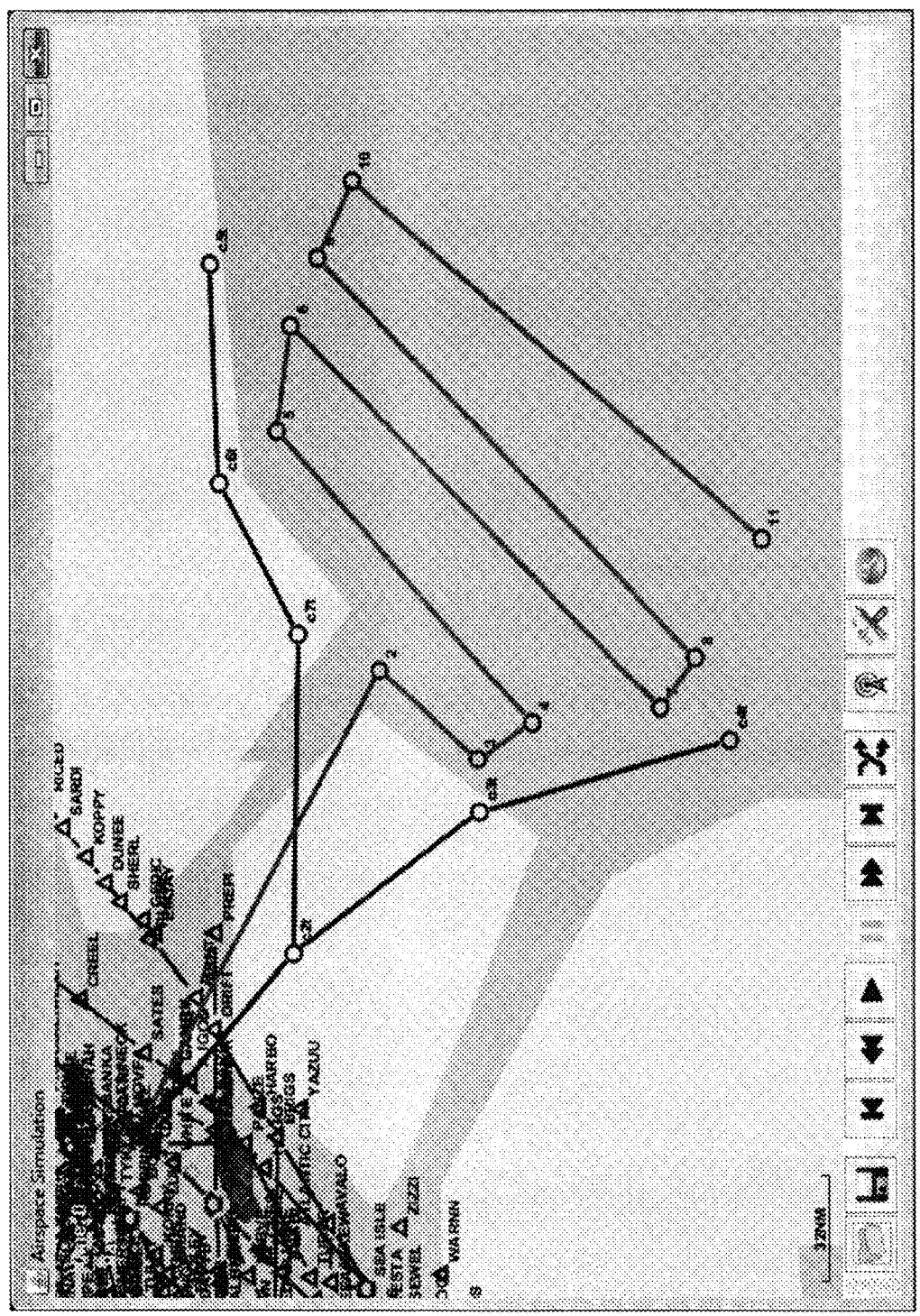
FIG. 6 shows a UAV flight plan for Scenario 1.

As shown in FIGS. 5 and 6, for scenario 1, Google map is used to locate the scenario region and picked the waypoint longitude and latitude. In all plans, the UAV starts from an airport and ends in an airport. The lost link routes are selected in unpopulated regions. Most lost link waypoints are also flight termination waypoints. In addition, restricted regions are avoided if possible when designing the routes. In the UAV plan images shown below, the red color circles are lost link waypoints. If the lost link waypoint is also a flight termination waypoint, then the color is brown.

In this particular scenario, the UAV is required to fly at very high altitudes while conducting particular operations, such as, maritime surface surveillance or acting as a communication relay. Thus, these operations could be required to take place at any location globally. These operations would be above most typical weather systems and also above the operating levels of other typical air traffic operations.

Weather induced lost link will be rare. Lost link is most likely caused by hardware failures. Fly pattern should follow a zigzag or some specially designed pattern tailored to that particular mission. In this scenario 1, a maritime surface surveillance in an oceanic region near New York is selected. The total surveillance region is about 100 NM by 100 NM.

The proposed system discussed above can be adapted to other contingencies, such as, engine failure, and broken wings, etc. It will be apparent to those skilled in the art that various modifications and variations can be made to the structure of the present disclosure without departing from the scope or spirit of the disclosure. In view of any possible embodiments in which the principles of the disclosed invention may be applied, it should be perceived that the illustrated embodiments are only preferred examples of describing the invention and should not be taken as limiting the scope of the invention.

What is claimed is:

1. A lost link contingency flight plan generating system, comprising:
   a database generating module;
   a Pilot-In-Control (PIC) for flying an Unmanned Aerial Vehicle (UAV);
   UAV flight computer in communication with an Air Traffic Controller;
   a primary flight plan for the UAV;
   a lost link contingency flight plan generator;
   a Risk Management Plan module;
   a Preparedness and Prevention Plan module;
   an Incident Response Plan module; and
   a Rescue and Recovery Plan module.

2. A lost link contingency plan generating system according to claim 1, wherein:
   the database generating module includes information of FAA regulations, UAV performance models, airspace structure, ground radio towers, airport locations, flight termination points, rally/reconnection waypoints, and hovering waypoints near airports.

3. A lost link contingency plan generating system according to claim 1, wherein:
   the Risk Management Plan module analyzes the risk against the causes of lost link throughout the primary flight plan with help of a Situation Analysis module.

4. A lost link contingency plan generating system according to claim 3, wherein:
   the Situation Analysis module assesses the risk of the lost link plan generated against multiple UAVs in the same area, and adjusts the primary flight plan in order to reach the destination safely.

5. A lost link contingency plan generating system according to claim 1, wherein:
   the Preparedness and Prevention Plan module standardizes the lost link plan generation by maximizing predictability of mishap UAVs, and confirmation from the Air Traffic Controller.

6. A lost link contingency plan generating system according to claim 5, further comprising:
   a Maintenance Data module for linking to a common ground control system; and a Case Based Reasoner module to help the PIC to prepare for a potential lost link plan before a lost communication happens.

7. A lost link contingency plan generating system according to claim 1, wherein:
   the Incident Response Plan module standardizes the communication between the PIC and the Air Traffic Controller, tracks flight status and possible trajectory for a mishap UAV by incorporating speed and time uncertainties, and redirects other nearby vehicles by sending the lost link plan to the Air Traffic Controller.

8. A lost link contingency plan generating system according to claim 1, wherein:
   the Rescue and Recovery Plan module refreshes the communication link when the UAV arrives at a rendezvous point, and specifies flight termination points in the lost link plan without creating collateral damages.

9. A method for generating a lost link contingency flight plan, comprising:
   controlling UAV in a mission area with a primary flight plan by a Pilot-In-Control (PIC);
   building various databases according to FAA regulations;
   building partial flight plans according to the various databases;
   assessing lost link risk of a new flight plan; and
   generating a lost link contingency flight plan according to results of the lost link risk assessment.

10. The method for generating a lost link contingency flight plan of claim 9, further comprising:
    assessing conflicts with other lost link contingency flight plans in the same area;
    mitigating weak links using Case-Based-Reasoner (CBR);
    generating a rescue and recovery plan; and
    executing the lost link contingency flight plan on-line according to the rescue and recovery plan.

11. The method for generating a lost link contingency flight plan of claim 9, wherein:
    the databases include any combination of FAA regulations, UAV performance models, airspace structure, ground radio towers, airport locations, flight termination points, rally/reconnection waypoints, and hovering waypoints near airports.

12. The method for generating a lost link contingency flight plan of claim 11, further comprising:
    generating stitches in the partial flight plans to connect any of the waypoints for flying the UAV to the flight termination points.

13. The method for generating a lost link contingency flight plan of claim 9, wherein:
    all of these partial plans can be generated off-line in order to reduce the contingency plan generation time.

14. The method for generating a lost link contingency flight plan of claim 9, wherein:
    the lost link risk assessment includes weather and communication equipment maintenance history information to assess the risk of lost link in the mission area.

15. The method for generating a lost link contingency flight plan of claim 14, further comprising:
    revising or aborting the primary flight plan if the lost link risk is deemed high.

16. The method for generating a lost link contingency flight plan of claim 10, further comprising:

preventing an intermittent lost link with an expert system using CBR to help the PIC mitigate the lost link before it actually happens.

17. The method for generating a lost link contingency flight plan of claim 9, further comprising:
executing the lost link contingency flight plan on-line after the lost link happens.

18. The method for generating a lost link contingency flight plan of claim 9, further comprising:
monitoring heartbeat signal between the UAV and the ground control station periodically; and
activating the lost link contingency flight plan if the heartbeat signal is lost for more than a preset time period in order to fly to certain locations safely.

19. The method for generating a lost link contingency flight plan of claim 9, further comprising:
integrating information from the partial plans with landing places and airports to form the lost link contingency flight plan.

\* \* \* \* \*

UNITED STATES PATENT AND TRADEMARK OFFICE
CERTIFICATE OF CORRECTION

PATENT NO. : 9,946,258 B2  
APPLICATION NO. : 15/193034  
DATED : April 17, 2018  
INVENTOR(S) : Chiman Kwan Page 1 of 1

It is certified that error appears in the above-identified patent and that said Letters Patent is hereby corrected as shown below:

In the Specification

Column 1 after Line 5, enter the following statement, after the invention title and before the paragraph starting with "This application claims priority to U.S. Provisional Patent Application No. 62/192,613 filed.....":

"ORIGIN OF THE INVENTION  
This invention was made with Government support under contract NNX13CC19P awarded by NASA. The Government has certain rights in this invention."

Signed and Sealed this  
Twenty-eighth Day of August, 2018

Andrei Iancu  
*Director of the United States Patent and Trademark Office*